Aug. 21, 1934.  G. HEYMER  1,970,890
PROCESS AND MULTICOLOR FILTER FOR PRODUCING
COLOR PICTURES ON LENTICULAR FILMS
Filed Feb. 26, 1931  2 Sheets-Sheet 1

Inventor:
Gerd Heymer,
By Philip S. Hopkins
Attorney.

Patented Aug. 21, 1934

1,970,890

UNITED STATES PATENT OFFICE 1,970,890

PROCESS AND MULTICOLOR FILTER FOR PRODUCING COLOR PICTURES ON LENTICULAR FILMS

Gerd Heymer, Dessau-Ziebigk in Anhalt, Germany, assignor to Agfa Ansco Corporation, Binghamton, N. Y., a corporation of New York Application February 26, 1931, Serial No. 518,519
In Germany February 28, 1930

8 Claims. (Cl. 95—2)

My present invention relates to a process for producing color pictures on lenticular films.

One of its objects is to provide that the images of the color filter projected by the different cylindrical lenses, touch one another.

Additional objects of my invention are the new color filters used in my process. Further objects of my invention will be seen from the detailed specification following hereafter.

In the process according to Berthon's specification No. 992,151 for preparing moving pictures in natural colors, use is made of a multi-color filter composed in its usual form of three parallel strips dyed in the fundamental colors red, green and blue, and of a panchromatic photographic material the support of which is embossed on its back which faces the objective during exposure, with microscopic refracting cylindrical lenses. The strips formed by the cylindrical lens elements run parallel to the longitudinal direction of the filter strips of the multi-color filter fitted in the plane of the diaphragm of the objective.

The present invention has for its object a process of producing photographic pictures reproducible in natural colors on films bearing microscopic refracting lens elements while observing the above-mentioned conditions, and a multi-color filter suited for the execution of this process. In the following description the invention is exemplified by a multi-color filter in the usual three fundamental colors red-green-blue; it is, however, not limited thereto, but may of course also be applied to processes in which color pictures are produced with the aid of multi-color filters of only two or more than three fundamental colors.

According to this invention the width of a series of color strips in the colors red-green-blue of the filter has a relation to the diameter of the single element of the lenticular embossing of the film.

Each lens element produces in the photographic layer a real image of the multi-color filter. The size of these filter images depends upon certain conditions. In theory an unobjectionable reproduction is best obtained by arranging that the filter images produced in the light sensitive layer by the adjacent lens elements just touch at their edges. This condition is fulfilled if the width of the filter images having the form of strips is equal in the direction at right angles to their length to the diameter of the cylindrical lenses in a direction at right angles to the focal line. If the images are larger than the diameter of the lenses, the two marginal stripes of two adjacent filter images would overlap, so that, for instance, in the case of the usual sequence of colors in a filter, viz. the succession of red-green-blue, a bluish-red colored marginal zone would be produced rendering the exact reproduction of the actual colors impossible. If the filter images are to be adjusted so that they do not overlap each other the following equation must be fulfilled:

$$n \cdot \frac{d}{f} = \frac{D}{F}.$$

In this equation $d$ is the diameter of the cylinder lenses in a direction at right angles to the focus line; $f$ is the focal length of the lens elements or the thickness of the support which is equal to this focal length; $D$ is the width of the multi-color filter or of its virtual image in a direction at right angles to the length of the strips, $F$ is the distance of the multi-color filter or of its virtual image from the plane of the lenticular screen and $n$ is the refractive index of the material constituting the film. Hence follows the equation:

$$D = \frac{F \cdot d \cdot n}{f}.$$

Therefore, according to this invention, the width of a series of color zones in the colors red-green-blue of the filter is so selected that the optical image projected of the said series of color zones by a lens element has just the diameter of this lens element. The result attained in the first place is that the filter images projected by the different cylindrical lenses touch one another, this is to say they cover the whole surface of the film throughout. In this case, the longitudinal extension of the filter strips may be chosen at will.

When working according to the hitherto known processes the utilizable aperture would, especially if objectives of large aperture are used, not totally be covered by the filter thus constructed, but would have to be obturated, with exception of the multi-color filter, in order to exclude false light. It has now been found that these portions of the light which would entirely be lost may also be utilized by repeating the series of the color strips in the succession of colors red-green-blue in the same sequence and breadth of the zones, in such a way that they adjoin both margins of the original series, either completely or incompletely, and, if necessary, several times. If the succession of the color zones from left to right be, for instance, blue-green-red, then it is continued according to this feature of the invention from the red strip in the succession bluegreen-red-blue-green-red etc. and on the other side from the blue strip in the order red-green-blue-red-green-blue etc. The number of repetitions of the series of color zones is determined by the dimensions of the view-taking objective used in each case. In general the repetition is continued up to the edge of the utilizable aperture of the objective, but it is likewise possible to discontinue the repetition so that a small part of the aperture remains uncovered by the light filter. The multi-color filter need not be composed of a whole-number multiple of the simple succession of the color strips but, in the above mentioned example, for instance, its outer strip on the left may be a green or red one and that on the right may be a blue or green one. Consequently, in the case of the simplest form of execution a filter consisting of, for instance, three fundamental colors, comprises five zones in the succession blue-red-green-blue-red.

The working method of the new process will now be illustrated by a three color filter having one repetition of a series of the color zones on each side, thus comprising 9 color zones altogether. In this case the image of the middle group of strips in the colors red-green-blue produced by a lens element of the film is of width equal to the diameter of the lens element. On the left and right there follow directly the images of the middle group projected by the two adjacent lens elements. Above the image of the middle group of strips projected by the middle lens there is moreover produced by the right lens element the image of the right group of strips of the filter, and by the left lens element the image of the left group of strips of the filter, the images produced by the three juxtaposed lens elements being in strict coincidence. Supposing the quantity of light, traveling to the light sensitive layer through a series of filter zones in the colors red-green-blue and a lens element, to be $i$, the quantity of light projected in the case of the described arrangement of the filter, on to the light sensitive layer behind each lens element, is $3i$.

In general, by the new arrangement of the filter strips the ratio of the total permeability of all filter strips of a fundamental color to the permeability of the total filter plane of the other fundamental colors will be changed in comparison with the ratio of permeability of the corresponding simple multi-color filter. In order to obtain the ratio of permeabilities ascertained for the emulsion to be employed, the color zones may be shortened in their longitudinal direction and thus the proportion of the colored surface be modified. It is, however, likewise possible to alter the permeability of the color surfaces. In this case it is advantageous to increase the permeability of that color which covers the smallest surface in the filter and to choose as the color to occupy the smallest surface that color the permeability of which can be increased with the smallest reduction of its spectral properties.

In the case of the three color filter the colors red and blue are best suited to this end. It is therefore recommendable to adopt for a filter consisting of five zones of three fundamental colors the color succession green-blue-red-green-blue or green-red-blue-green-red, since in the case of red and blue a brightening is possible in comparison with the three color filter hitherto used by reducing the dyestuff concentration without production of any essential deterioration of the color selection. For daylight exposures the middle zone is preferably given a blue color and for nitra-light exposures a red color.

In general the filter zones of the same fundamental colors will have exactly the same spectral permeability. But the possibility exists to impart to the zones of the same kind, i. e. having the same coloration, while preserving their fundamental color, a different spectral permeability so that by the combination of two color strips which are unsuitable by themselves an improved selection of colors may be attained.

The color filters described comprising several zones can be applied not only to the production of cinematographic pictures in natural colors according to the known Berthon process, but are generally suited for all processes which hitherto used multi-color filters consisting of three strips.

The invention is illustrated in the accompanying drawings, in which Fig. 1 shows the way in which a series of color zones is reproduced by a lens element placed with its centre in the optical axis of the objective.

Figure 1:
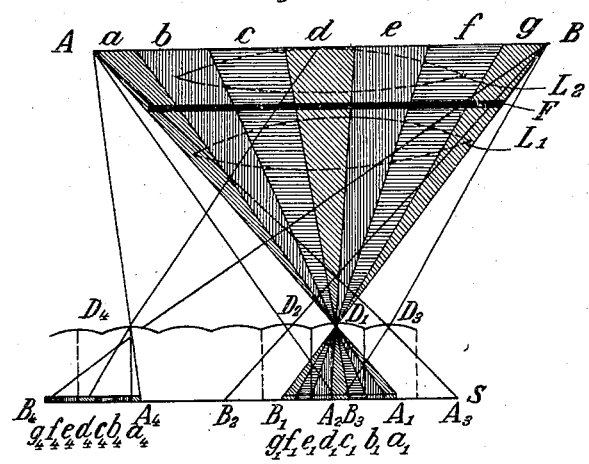

In Fig. 1 $L_1$ and $L_2$ are two lenses constituting the objective, F is the multi-color screen from which, seen from the lenticular film, a virtual image is projected at A, B, by the lens $L_1$ showing the color zones $a, b, c, d, e, f, g$. From this virtual picture A B the picture $A_1 B_1$ showing the color zones $a_1, b_1, c_1, d_1, e_1, f_1 g_1$ is projected by the lens element $D_1$ of the lenticular film on the photographic layer S. In this case only the color sequence $c_1 d_1 e_1$ corresponds to the diameter of the lens element $D_1$. The images $A_2 B_2$ and $A_3 B_3$ projected by the lens elements $D_2$ and $D_3$ of the lenticular film partially are superposed over the image projected by $D_1$, however, in such a manner that the isochromatic colors coincide.

In the case of lateral lens elements of the film a displacement of the projected color zones occurs, so that the middle part of the image of the composed color filter does not coincide with the optical axis of the lens elements, a fact which, however, is not of principal importance for my new method.

Figure 2:
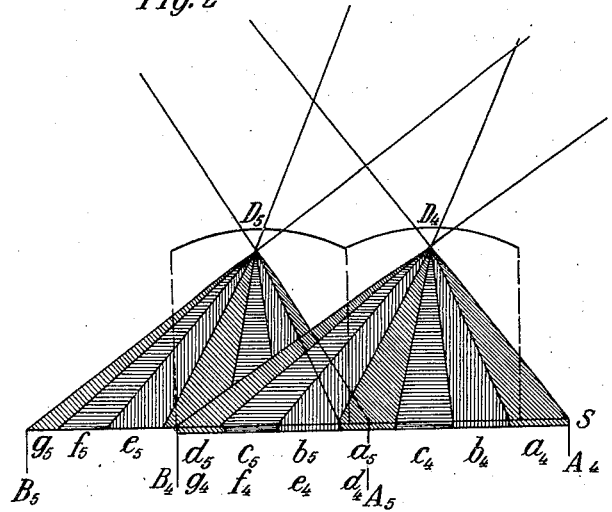
Fig. 2 shows how the color screen is reproduced by the lateral lens elements.

In Fig. 2 two lateral lens elements of the lenticular film are shown on an enlarged scale, projecting into the light sensitive layer the images $A_4 B_4$ and $A_5 B_5$ of the parallel virtual image of the color screen, said images $A_4 B_4$ and $A_5 B_5$ being partially superposed. A single color sequence red-green-blue in this case, likewise, corresponds to the breadth of a lens element; the reproduced images $d_4$ and $d_5$ of the middle part $d$ of the color screen projected by the lens elements $D_4$ and $D_5$ are displaced with respect to the optical axis of the latter.

Figure 3:
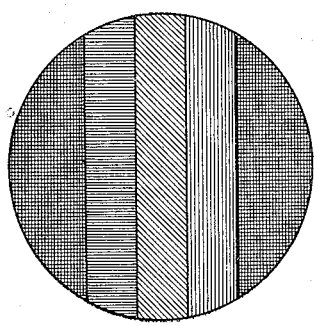
Figs. 3 to 8 show different light filters.

Fig. 3 shows a normal color filter as hitherto used.

Figure 4:
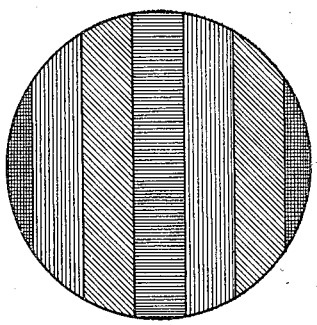
Figure 5:
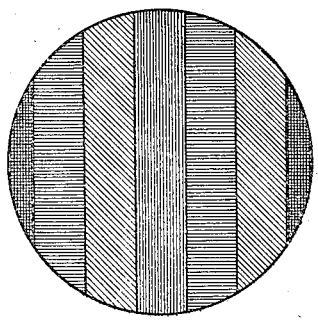

In Fig. 4 a color filter is shown for daylight exposure comprising five color zones in the three fundamental colors blue, green and red, the middle zone being blue, while Fig. 5 shows a similar filter for nitra-light exposure having a middle zone of red color.

Figure 6:
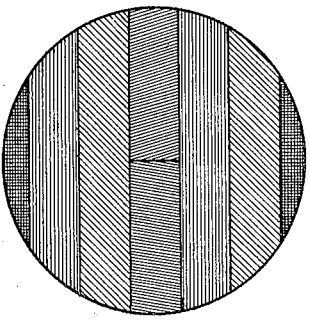

In the color filter illustrated in Fig. 6 the middle zone having blue as a fundamental color, is composed of two parts, one being bluish-violet and the other bluish-green. By this combination, an improved selection of colors may be attained.

Figure 7:
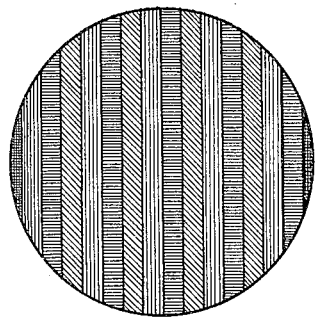
Figure 8:
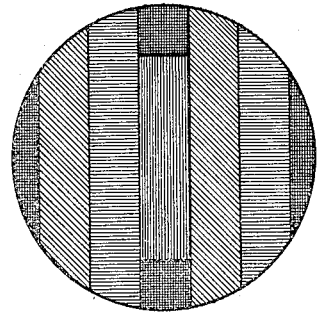

Fig. 7 shows a color filter with several repetitions of the color sequences blue, green and red, to be used in the case of an objective with great aperture, and Fig. 8 shows a color filter in which the red middle zone is partly covered in order to avoid predominance of red.

What I claim is:—

1. In an apparatus for producing pictures on lenticular films reproducible in true colors, in operative combination, a lenticular film, an objective, and a multi-color filter provided with a number of color strips of the fundamental colors arranged in succession and in the same sequence and surpassing the number of fundamental colors used, but being so selected that towards the margin of the filter no complete repetition of the middle series of fundamental colors takes place and the permeability of the strips of each color being so adjusted that the required amounts of light of the fundamental colors pass through the filter, the relation between the lenticular embossings forming cylindrical lenses and the multi-color filter being subject to the condition $$D = \frac{F.d.n}{f}$$

D being the width of the virtual image of one series of fundamental colors, if the multi-color filter is positioned in such a manner that lenses are disposed or located between the film and the filter, and being the width of one series of fundamental colors of the multi-color filter itself, if the latter is positioned between the film and the objective, $d$ being the diameter of the cylindrical lenses, F being the distance of the virtual image of the multi-color filter from the cylindrical lenses, $f$ being the focal length of the cylindrical lenses, and $n$ being the refractive index of the material constituting the film.

2. In an apparatus for producing pictures on lenticular films reproducible in true colors, in operative combination, a lenticular film, an objective, and a multi-color filter provided with a number of color strips of the three fundamental colors blue, green and red arranged in succession and in the same sequence and surpassing the number of fundamental colors used but being so selected that towards the margin of the filter no complete repetition of the middle series of fundamental colors takes place and the permeability of the strips of each color being so adjusted that the required amounts of light of the colors blue, green and red pass through the filter, the relation between the lenticular embossings forming cylindrical lenses and the multi-color filter being subject to the condition $$D = \frac{F.d.n}{f}$$

D being the width of the virtual image of one series of fundamental colors, if the multi-color filter is positioned in such a manner that lenses are disposed or located between the film and the filter, and being the width of one series of fundamental colors of the multi-color filter itself, if the latter is positioned between the film and the objective, $d$ being the diameter of the cylindrical lenses, F being the distance of the virtual image of the multi-color filter from the cylindrical lenses, $f$ being the focal length of the cylindrical lenses, and $n$ being the refractive index of the material constituting the film.

3. In an apparatus for producing pictures on lenticular films reproducible in true colors, in operative combination, a lenticular film, an objective, and a multi-color filter provided with a number of color strips of the fundamental colors blue, green and red arranged in succession and in the same sequence with the blue strip as the middle strip and surpassing the number of fundamental colors used but being so selected that towards the margin of the filter no complete repetition of the middle series of fundamental colors takes place and the permeability of the strips of each color being so adjusted that the required amounts of light of the colors blue, green and red pass through the filter, the relation between the lenticular embossings forming cylindrical lenses and the multi-color filter being subject to the condition $$D = \frac{F.d.n}{f}$$

D being the width of the virtual image of one series of fundamental colors, if the multi-color filter is positioned in such a manner that lenses are disposed or located between the film and the filter, and being the width of one series of fundamental colors of the multi-color filter itself, if the latter is positioned between the film and the objective, $d$ being the diameter of the cylindrical lenses, F being the distance of the virtual image of the multi-color filter from the cylindrical lenses, $f$ being the focal length of the cylindrical lenses, and $n$ being the refractive index of the material constituting the film.

4. In an apparatus for producing pictures on lenticular films reproducible in true colors, in operative combination, a lenticular film, an objective, and a multi-color filter provided with a number of color strips of the fundamental colors blue, green and red arranged in succession and in the same sequence with the red strip as the middle strip and surpassing the number of fundamental colors used but being so selected that towards the margin of the filter no complete repetition of the middle series of fundamental colors takes place and the permeability of the strips of each color being so adjusted that the required amounts of light of the colors blue, green and red pass through the filter, the relation between the lenticular embossings forming cylindrical lenses and the multi-color filter being subject to the condition $$D = \frac{F.d.n}{f}$$

D being the width of the virtual image of one series of fundamental colors, if the multi-color filter is positioned in such a manner that lenses are disposed or located between the film and the filter, and being the width of one series of fundamental colors of the multi-color filter itself, if the latter is positioned between the film and the objective, $d$ being the diameter of the cylindrical lenses, F being the distance of the virtual image of the multi-color filter from the cylindrical lenses, $f$ being the focal length of the cylindrical lenses, and $n$ being the refractive index of the material constituting the film.

5. A multi-color filter for taking pictures on lenticular film comprising a number of color strips of the fundamental colors arranged in succession and in the same sequence and surpassing the number of fundamental colors, but being so selected that towards the margin of the filter no complete repetition of the middle series of fundamental colors takes place, the permeability of the strips of each color being so adjusted that the required amounts of light of the fundamental colors pass through the filter.

6. A multi-color filter for taking pictures on lenticular film comprising a number of color strips of the three fundamental colors blue, green and red arranged in succession and in the same sequence and surpassing the number of fundamental colors, but being so selected that towards the margin of the filter no complete repetition of the middle series of fundamental colors takes place, the permeability of the strips of each color being so adjusted that the required amounts of light of the colors blue, green and red pass through the filter.

7. A multi-color filter for taking pictures on lenticular film comprising a number of color strips of the fundamental colors blue, green and red arranged in succession and in the same sequence with the blue strip as the middle strip and surpassing the number of fundamental colors, but being so selected that towards the margin of the filter no complete repetition of the middle series of fundamental colors takes place, the permeability of the strips of each color being so adjusted that the required amounts of light of the colors blue, green and red pass through the filter.

8. A multi-color filter for taking pictures on lenticular film comprising a number of color strips of the fundamental colors blue, green and red arranged in succession and in the same sequence with the red strip as the middle strip and surpassing the number of fundamental colors, but being so selected that towards the margin of the filter no complete repetition of the middle series of fundamental colors takes place, the permeability of the strips of each color being so adjusted that the required amounts of light of the colors blue, green and red pass through the filter.

GERD HEYMER.